June 23, 1970  J. R. DURIO ET AL  3,517,297
MULTI-OUTPUT DC POWER SUPPLY MEANS
Filed Oct. 14, 1968  3 Sheets-Sheet 1

INVENTORS
JOHN R. DURIO
HARVEY S. TAYLOR
BY Donald W. Phillion
ATTORNEY

FIG. 2

(A) SINGLE PHASE INPUT $A \sin \omega_1 t$ (B) $B \sin \omega_1 t$ OUTPUT (C) $B \cos \omega_1 t$ OUTPUT (D) CHOPPER FREQUENCY $\sin \omega_c t$ (E) CHOPPER OUTPUT $B \sin \omega_1 t \sin \omega_c t$ (F) CHOPPER OUTPUT $B \cos \omega_1 t \sin \omega_c t$

←→ 90°

(G) CURVE F PHASE SHIFTED BY 90° = $B \cos \omega_1 t \cos \omega_c t$ (H) CURVE E + CURVE G = $C \sin(\omega_c - \omega_1) t$ INVENTORS.
JOHN R. DURIO
HARVEY S. TAYLOR
BY Donald W. Phillion
ATTORNEY

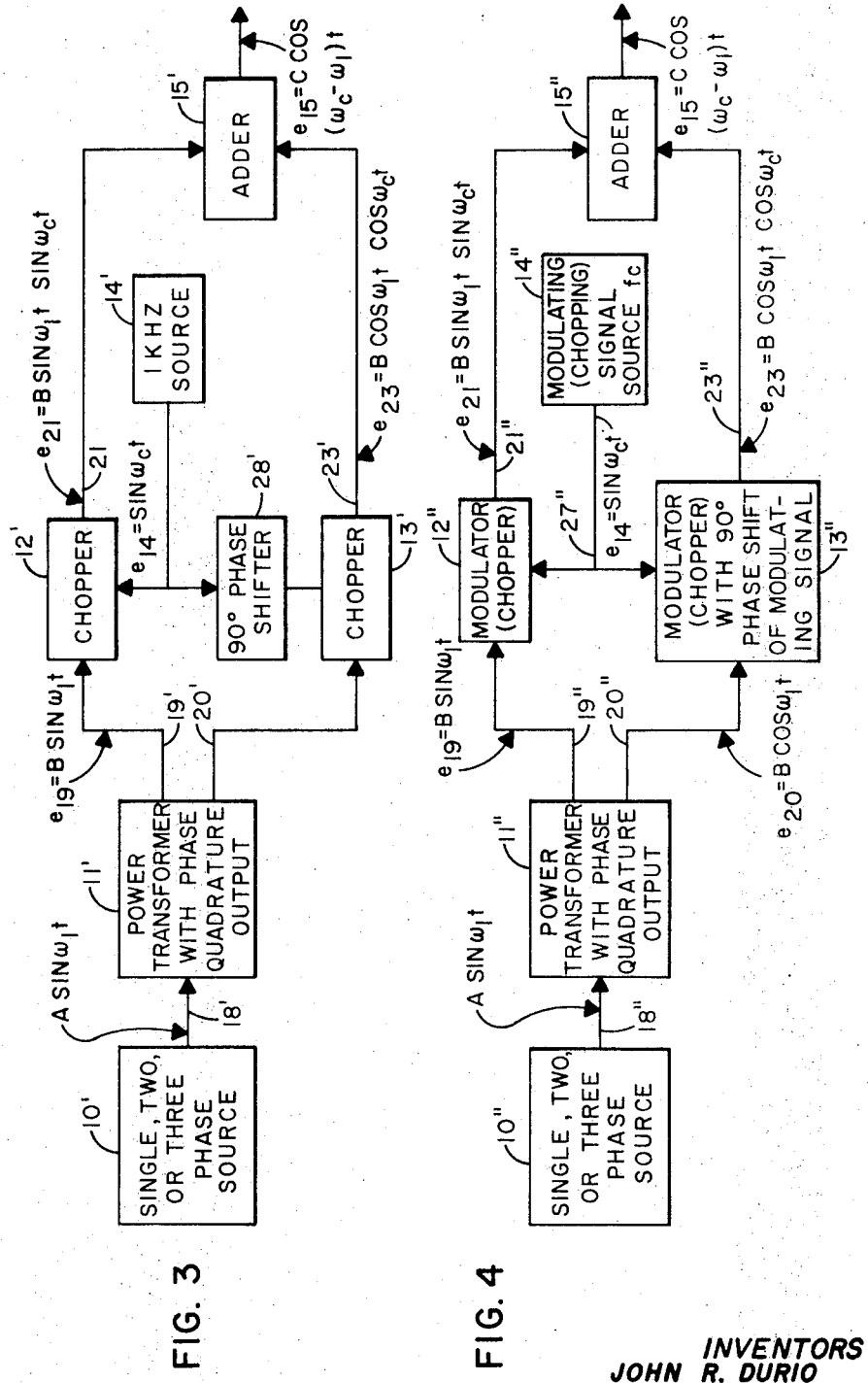

3,517,297
MULTI-OUTPUT DC POWER SUPPLY MEANS
John R. Durio and Harvey S. Taylor, Newport Beach, Calif., assignors to Collins Radio Company, Cedar Rapids, Iowa, a corporation of Iowa
Continuation-in-part of application Ser. No. 703,367, Feb. 6, 1968. This application Oct. 14, 1968, Ser. No. 767,229
Int. Cl. H02m 1/12
U.S. Cl. 321—9   3 Claims

ABSTRACT OF THE DISCLOSURE

A D-C power supply wherein the A-C source of frequency $f_1$ which can be single, two or three phase, is supplied to a power transformer which produces an A-C output comprised of quadrature components of frequency $f_1$. The A-C component outputs are chopped by a common signal of frequency $f_c$, where $f_c \gg f_1$. The two chopped signals are then added together so that the $f_1$ frequency component cancels out, leaving a constant amplitude signal of frequency $(f_c - f_1)$.

---

This is a continuation in part of copending application Ser. No. 703,367 filed Feb. 6, 1968 and entitled "Power Supply."

This invention relates generally to D-C power supplies and particularly to a D-C power supply with little ripple and of small cost.

There are in the prior art many different types of D-C power suplies. One of the more elementary comprises the supplying of a single phase 60 Hz. source to a power transformer, the output of which is rectified and then filtered. Because of the 60 Hz. component, both the transformer and the filter must be relatively large, with corresponding expense. For example, a filter capable of handling a 60 Hz. component requires large capacitors and inductors, both of which are exptnsive.

Another approach to the D-C power supply problem involves the initial filtering of a single-phase 60 Hz. source to produce a raw D-C voltage. This raw D-C voltage is chopped to a higher frequency which is then steped up or down by suitable transformer means, and the output thereof rectified and filtered. While with this second approach the transformer means can be appreciably smaller because of the higher frequency of the chopped signal, the filter must still contain large inductors and capacitors since a 60 Hz. component is still present. Further, because it is sometimes necessary to supply different values of D-C voltages to different equiments located physically apart from each other, a plurality of such large filters ordinarily would be required.

An additional expense is often incurred in prior art systems due to the need of a separate filter for each different D-C voltage required at a given equipment, since each such D-C voltage will contain a 60 Hz. component.

It is a primary object of the invention to provide a D-C power supply in which only one large transformer, and no large filters, are required to supply D-C power to a number of different equipments, each needing several different D-C voltage levels.

A second purpose of the invention is to provide a plurality of different D-C voltages, each with a minimum of ripple and employing only a single large transformer and no large filters.

A third object of the invention is an inexpensive D-C power supply having relatively small riple therein; and A fourth purpose of the invention is the improvement of D-C power supplies, generally.

In accordance with the invention, a 60 Hz. three phase A-C power source is supplied to a power transformer which is constructed to produce two output signals, in phase quadrature, and each having a frequency of 60 Hz. Alternately two phase power could be supplied by a motor-generator. The two quadrature signals are supplied to separate choppers which are energized by a common chopping signal source which can have a frequency of one or two kHz., for example. The outputs of the two separate choppers are signals having a 60 Hz. envelope, with a fine structure, or carrier signal, having a frequency equal to the difference between the chopping signal frequency and the 60 Hz. input. One of these chopper output signals is then shifted by 90°. This shifts the fine structure only, leaving the envelope still at 90° with respect to the other chopper signal outut. These two signals, when added together in a suitable adding circuit, function to produce a sine wave of constant peak amplitude with the relatively high frequency (chopping frequency −60 Hz.) signal. This constant peak amplitude, high frequency signal can then be supplied to equipments, each of which can contain small transformers for converting the high frequency signal to a desired amplitude. Rectifying means and small filters located in the equipments are then employed to convert the signal to a suitable D-C value. Because of the high frequency, both the transformers and the filters can be small, with a corresponding low cost.

In accordance with an important feature of the invention, only one large power transformer is required for all equipments. This power transformer can be located in some central source and, as described above, functions to produce two 60 Hz. outputs signals in phase quadrature.

The above-mentioned and other objects and features of the invention will be more fully understood from the following detailed description thereof when read in conjunction with the drawings in which:

FIG. 2 is a series of waveforms showing the nature of the signal at various points in the circuit of FIG. 1;

FIG. 3 is a block diagram of an alternative form of the invention; and

FIG. 4 is a generalized block diagram of the invention.

Figure 1:
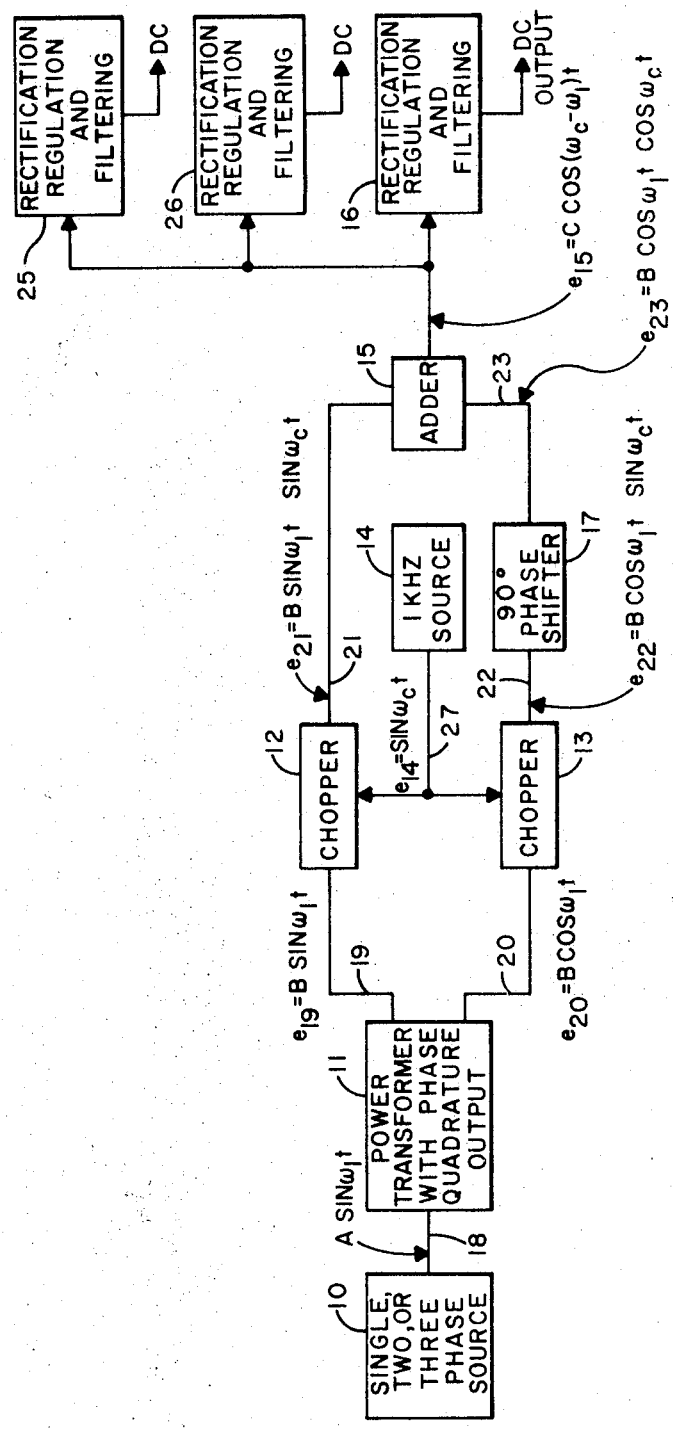
FIG. 1 is the block diagram of the invention.

Referring now specifically to FIG. 1, the source 10 provides a 60 Hz. voltage, which may be either two phase or three phase, to a power transformer 11. One phase is shown in the curve of FIG. 2A. Transformer 11 is constructed to produce two output signals on output terminals 19 and 20 in phase quadrature, as shown in the waveforms of 2B and 2C, respectively, which waveforms having the following general expressions:

$$e_{19} = B \sin \omega_1 t \tag{1}$$

$$e_{20} = B \cos \omega_1 t \tag{2}$$

An alternate method of generation would be to use quadrature taps on a motor-generator set. The two phase quadrature signals represented by Expressions 1 and 2 are supplied respectively to choppers 12 and 13, which are energized by a one kHz. signal from source 14. Such signal is reresented by the following expression:

$$e_{14} = \sin \omega_c t + \text{odd harmonics} \tag{3}$$

Shown in the waveforms E and F of FIG. 2 are the outputs of choppers 12 and 13, which outputs can be seen to have an envelope of sine wave construction, a fine frequency structure of the one kHz. source 14, and (ignoring higher harmonics) which are represented by the following expressions:

$$e_{21} = B \sin \omega_1 t \sin \omega_c t \tag{4}$$

$$e_{22} = B \cos \omega_1 t \sin \omega_c t \tag{5}$$

The waveform F of FIG. 2 (Expression 5) is next phase shifted by 90°. This action shifts only the fine structure and provides a signal (waveform G of FIG. 2) represented as follows:

$$e_{23} = B \cos \omega_1 t \cos \omega_c t \quad (6)$$

The waveforms E and G of FIG. 2 (Expressions 4 and 6) are added together in adder 15 to provide an output signal of constant peak amplitude and having a frequency of the difference between the chopper frequency and the 60 Hz. input. Such a waveform is shown in the waveform H of FIG. 2 and is represented by the following expressions:

$$e_{15} = C \sin (\omega_c - \omega_1) t \quad (7)$$

It is to be understood that while the waveform of FIG. 2(H) is designated as being a simple sine wave, it is in fact somewhat square-wave in nature and, to be precise, should be represented by a mathematical series comprised of the fundamental and the odd harmonics of the frequency ($f_c - f_1$). Similarly, the waveforms shown in curves 2D through 2G are also more complex than the function indicated in the drawing and specification and are, in fact, composite signals comprised of many harmonics. However, since the odd harmonics of the chopping frequency play a relatively small part in the ultimate output signal of the circuit, the waveforms in the figures and in the specification are herein designated as simple sine or cosine functions of the fundamental frequencies.

The relatively high frequency, constant peak amplitude output of adder 15 can then be supplied to any number of structures, such as indicated by the blocks 25, 26, or 16, each of which can include rectification means. voltage regulation means, and filtering means. If desired, the blocks 25, 26, or 16, which can be located in the equipment, can also include transformer means to step the voltage up or down, as desired. Both the transformer means and the filtering means are required to handle only the one kHz. component, since the 60 Hz. component has been completely removed within adder 15. Thus the transformer and filtering means of block 16 can be relatively inexpensive as compared with transformer means and filtering means which would be required if a 60 Hz. component were present.

It is not necessary that the 90° phase shift circuit 17 follow the chopper 13. Alternatively, such 90° phase shifting means can precede the chopper as shown in FIG. 3, where the phase shifting means 28' is interposed between 1 kHz. source 14' and chopper 13', or, as a third modification, such phase shifting means can be incorporated as part of the chopper or modulating means of FIG. 4.

The operation of the circuits of FIGS. 3 and 4 are very similar to that of FIG. 1 and should be readily apparent to one skilled in the art. Therefore, no further discussion of the operation of FIGS. 3 and 4 will be given.

It is to be noted that the forms of the invention shown and described herein are but preferred embodiments thereof and that various changes may be made therein, including adaptations to multiphase sources, without departing from the spirit or scope thereof.

We claim:
1. Multi-output power supply means comprising:
an A-C signal source for producing a first A-C signal of constant frequency $f_1$;
transformer means responsive to said A-C signal to produce second and third A-C signals in phase quadrature and of frequency $f_1$;
first and second modulating means each comprising chopping means and constructed to chop said second and said third A-C signals at a constant rate $f_c$ to produce fourth and fifth A-C signals, each having an envelope of frequency $f_1$, and having fine frequencies of $f_c$ and $f_c \mp 90°$ respectively, where $f_c$ is greater than $f_1$;
adding means for adding said fourth and fifth A-C signals to produce a sixth A-C signal of constant peak amplitude and of frequency $f_c - f_1$;
distribution means for supplying said sixth A-C signal to a plurality of destinations;
and means located at said destinations for rectifying said sixth A-C signal.

2. Power supply means in accordance with claim 1 in which:
said first A-C signal can be represented as $A \sin \omega_1 t$;
said second and third A-C signals can be represented as $B \sin \omega_1 t$ and $B \cos \omega_1 t$, respectively;
said fourth and fifth A-C signals can be represented as $B \sin \omega_1 t \sin \omega_c t$ and $B \cos \omega_1 t \cos \omega_c t$, respectively, where $\omega_c = 2\pi f_c$, with $f_c$ being the chopper modulating frequency; and
said sixth A-C signal can be represented as $C \cos (\omega_c - \omega_1) t$.

3. Power supply means in accordance with claim 2 in which:
said second modulating means comprises a 90° phase shifting means electrically connected between said chopping means of said second modulating means and said adding means.

References Cited
UNITED STATES PATENTS

| | | | |
|---|---|---|---|
| 2,635,226 | 4/1953 | Harris | 328—155 XR |
| 2,668,238 | 2/1954 | Frink | 328—155 |
| 3,249,845 | 5/1966 | Gustafson et al. | 321—69 XR |
| 3,259,800 | 7/1966 | Evans | 321—60 XR |

WILLIAM M. SHOOP, JR., Primary Examiner

U.S. Cl. X.R.
321—60; 332—22